Feb. 26, 1963 W. R. WOOLRICH 3,078,687
MULTI-IMMERSION QUICK FREEZER
Filed June 27, 1958 4 Sheets-Sheet 1
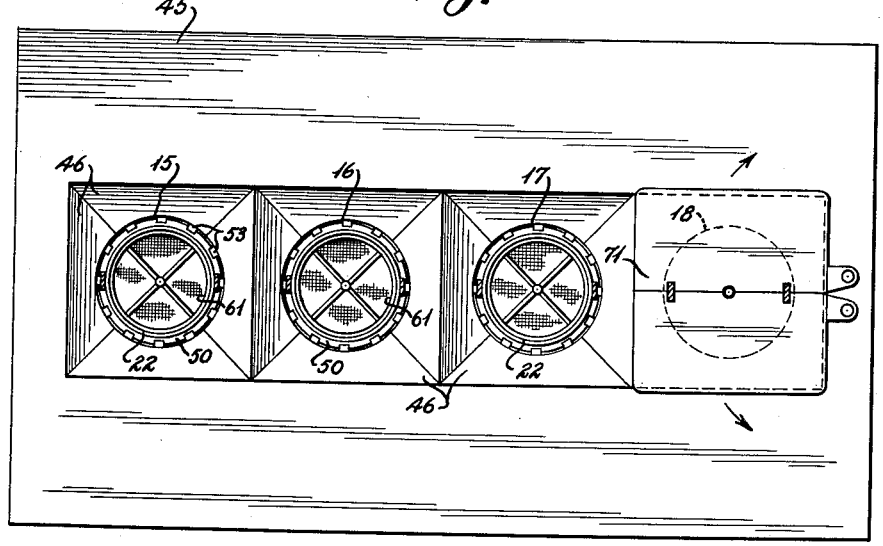
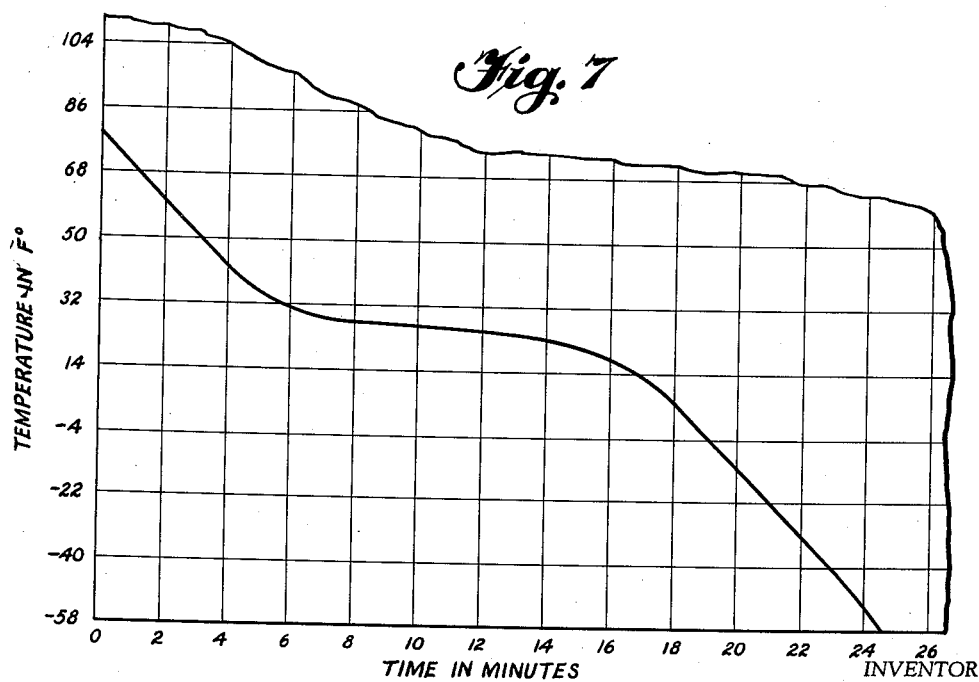
INVENTOR
Willis R. Woolrich
BY Henry H. Snelling
ATTORNEY Feb. 26, 1963  W. R. WOOLRICH  3,078,687
MULTI-IMMERSION QUICK FREEZER
Filed June 27, 1958  4 Sheets-Sheet 3

INVENTOR
Willis R. Woolrich
BY Henry H. Snelling
ATTORNEY

Feb. 26, 1963

W. R. WOOLRICH 3,078,687

MULTI-IMMERSION QUICK FREEZER

Filed June 27, 1958

INVENTOR
Willis R. Woolrich
BY Henry H. Snelling
ATTORNEY

United States Patent Office 3,078,687
Patented Feb. 26, 1963

3,078,687
MULTI-IMMERSION QUICK FREEZER
Willis R. Woolrich, 700 Texas Ave., Austin, Tex.
Filed June 27, 1958, Ser. No. 745,117
12 Claims. (Cl. 62—64)

This invention relates to refrigeration, especially to the quick freezing of various types of material. It has for its principal object the provision of a method and apparatus for such freezing in a manner to decrease the cost of the operation by use of higher refrigeration efficiency secured by division of the work load into stages where the apparatus of each stage operates in such cooling range as to carry the particular article to be frozen to its ultimate frozen temperature in equal load shares.

A second object of the invention is to design an apparatus for quick freezing where the objects to be frozen are loaded serially into open topped receptacles partly filled with a suitable liquid heat transfer medium and oscillated about vertical axes rotating with but not fast to a scraper oscillator within a coaxial refrigerating can.

A third object of the invention is to provide a series of freezing cans and scraper agitators in alined relation and to convey the articles to be frozen serially from can to can at decreasing temperatures in which advantage may be taken of the higher specific gravity of cold air so that ready inspection of the freezing operation is possible without appreciable loss of refrigeration to the atmosphere above when the cylindrical cans are vertical and are deeper than their diameter.

A fourth object of the invention is to devise a multi-stage freezing apparatus where each machine has at least three freezing units with parallel axes and a final centrifugal draining device all equally spaced apart with a common top draining to proximate units so there is no need to make any effort to reduce draining of the liquid heat transfer medium from the wire baskets which carry the articles from stage to stage.

In the drawings:

FIG. 1 is a schematic plan view of a machine employing the invention;

FIG. 7 is a chart showing a typical freezing range plotted against temperature and time.

Figure 2:
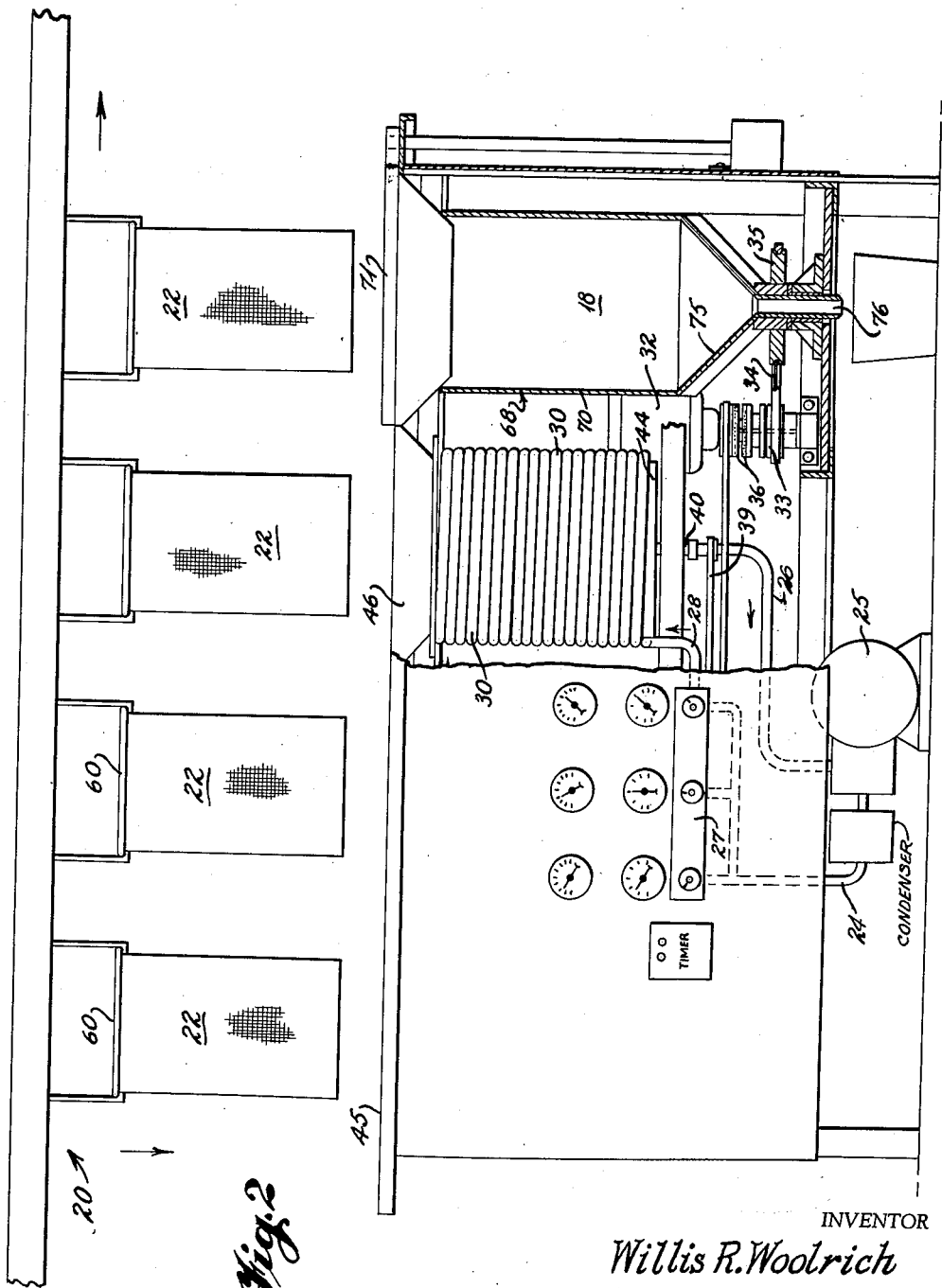
FIG. 2 is a side elevation partly in section.
Figure 3:
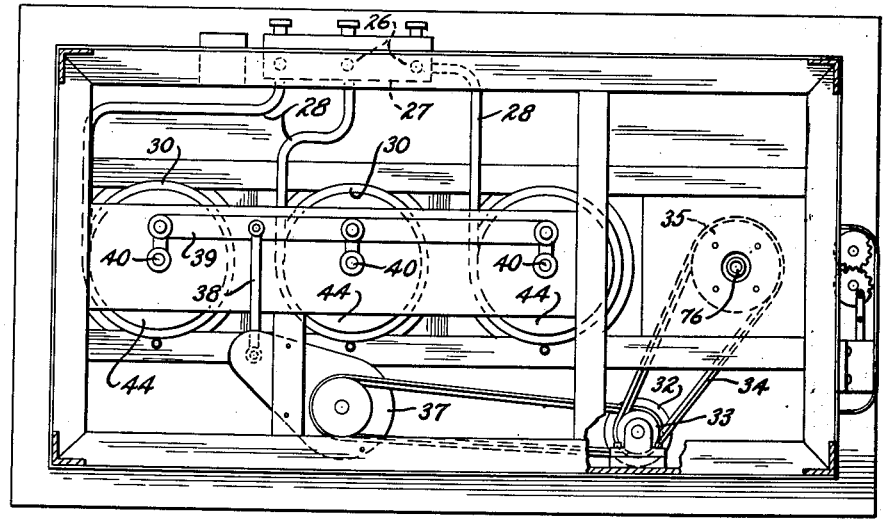
FIG. 3 is a plan view.

Referring particularly to FIGS. 1 and 2, the machine includes a number of units, preferably at least three in number, plus a final separator element, these being arranged in line, 15 being the chiller element, 16 the sharp freezer, 17 the deep freezer and 18 the separator for removing as much of the liquid heat transfer medium as desired. These units are alined in order that the material to be frozen can be supplied to the machine in wire baskets 22 which are lowered consecutively into the four units illustrated as by a conveyor 20 of any desired type which operates step by step, at each dwell removing a wire basket 22 from one unit, lifting it, moving it over to the next unit and depositing in such next unit, the period of a cycle varying usually from three to seven minutes, depending upon the material which is to be frozen and the size of the pieces. While the path of the conveyor is illustrated as being in a straight line, the path could be curved or of other shape. In freezing tropical fruits such as mango, papaya, guava, etc. where the freezing range is from 30° F. to zero, and three freezing stages are used, the first stage would lower the temperature to one or two degrees above freezing, the second stage to somewhere between 27° F. and 24° F. and the third or last stage to perhaps 5° F., so the load on each would be equal, no water being frozen in the first stage but 50% of the water would be turned into ice in each of the last two stages, the exact temperatures being determined by plotting the freezing range for the article being frozen as a curve where the ordinates are degrees Fahrenheit and the abscissas are minutes.

A compressor 25 (FIG. 2) withdraws a chilling medium of the halogenated hydrocarbon type such as Freon gas through the suction line 26 and delivers the liquid Freon through pipe 24 to an expansion valve 27 and line 28 to coil 30 of the freezing unit. The tubular coil 30 is preferably of half-inch soft copper drawn tubing and is wound tightly on the can 44, preferably being soldered as at 48 to fill the spaces between the coils of the helix to give better conduction from the tube 30 to the wall of the can 44. The motor 32 through suitable gearing such as pulley 33, belt 34 and pulley 35 rotates the separator 18 as controlled by clutch 36. The motor 32 also, through an eccentric connection 37, arm 38 and crank arm 39, oscillates the stainless steel shafts 40 of the respective units.

Figure 4:
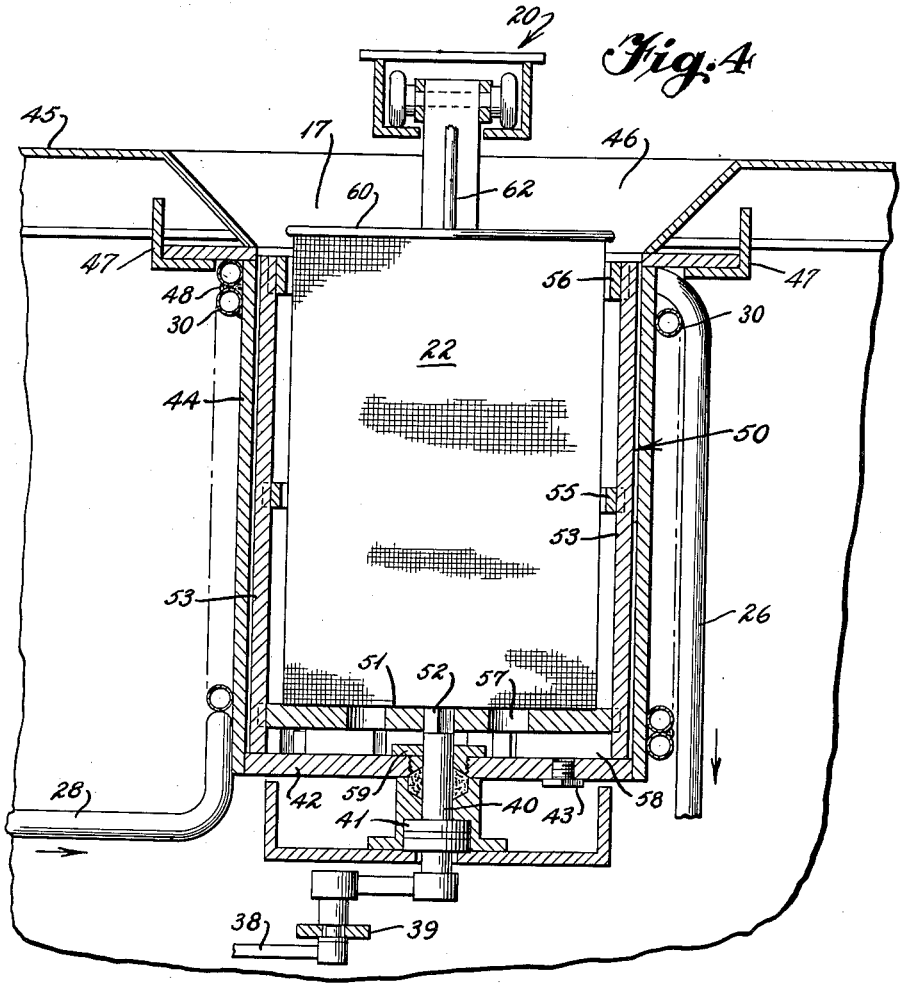
FIG. 4 is a vertical section through a freezer unit.
Figure 5:
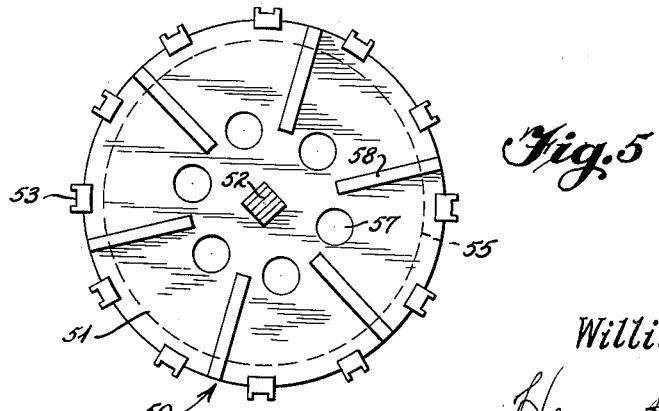
FIG. 5 is a bottom plan view of the agitator.

Referring now more particularly to FIG. 4, the vertical oscillating shaft 40 supported in bearings 41, preferably of roller or ball type, passes through the bottom 42 of the can 44 of one of the units 15, 16, or 17, these being alike and each being arranged equally spaced in the path of the conveyor 20 so that the drainboard 45 will drain into either proximate unit by virtue of the conical funnel portions 46. The can 44 does not move and has a drain shown diagrammatically as closed by a plug 43. Its dished flange 47 underlies the funnel member 46, which is preferably conical, to direct surplus heat transfer medium such as a sugar solution back into the can 44.

The scraper agitator 50 oscillates within the can 44 as its metal bottom 51 has a square hole to receive the square end 52 of shaft 40. The scrapers 53 are channel shaped and are held in vertical position by the bottom 51 and two rings 55 and 56 in which the scrapers are recessed as they also are in the bottom. The latter has a plurality of holes 57 to allow circulation of the sugar solution and has a number of radial ribs 58 resting on the bottom 42 of the can to prevent formation of ice, the ribs well clearing the packing gland nut 59.

Figure 6:
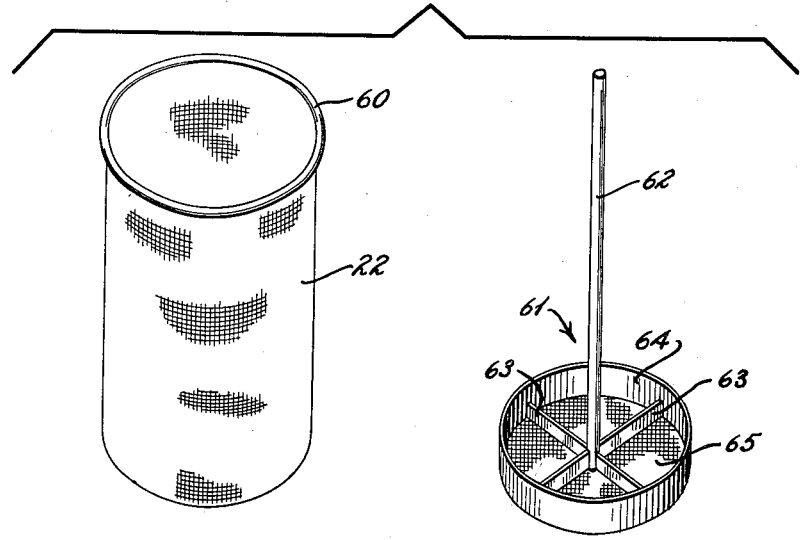
FIG. 6 is a perspective of the basket and the weighting element.

The agitator insert is a wire basket 22 fitting inside the rings 56 and 55. A convenient size is 7" diameter, 10" deep, with ¼" x ¼" mesh wire, having a round wire rim 60. A weighting element 61 (FIG. 6) with a long central handle rod 62 carrying braces 63 secured to a circular rim 64 secured to the mesh bottom 65 rests upon the fruit being frozen and keeps it submerged in the sugar solution indicated at 65 and described in Patent 2,418,746 of which I am a joint inventor, such heat transfer medium preferably being a viscous sugar in water solution, with the sugar varying from 60% to 67%. The fruit in such a viscous solution tends to rise, hence the need of the weighting pan 61 to hold the fruit below the surface of the sugary heat transfer medium 65. There is no difference in vapor pressure between the sugar solution and the product as both are solutes and consequently the proper balance is maintained.

The separator 18 includes a can 68 (FIG. 2) slightly larger in diameter than the basket 22 with its cylindrical portion 70 appreciably deeper. A wooden lid 71 swings out of the way when a filled basket is to be inserted in can 68 and prevents loss of the sugar solution which drains into the conical bottom 75 when the basket is rotated and is discharged as at 76 into a suitable container.

The operation is as follows: The papayas or other tropical fruits which are received in normal market condition are first skinned, usually with a knife; the seed is then taken out and the fruit cut up or diced, the size of pieces varying anywhere from perhaps as little as 1/10" or 1/4" to pieces the size of a peach half, say three inches in greatest dimension. Generally the pieces are no longer than 2" in greatest dimension in order that they may quickly freeze. Next the diced fruit is subjected to a temperature, usually about 180° F., to blanch the fruit, this operation destroying certain enzymes normally present in the fruit and which could give an unpleasant taste. The thus prepared fruit is loaded into the wire basket 22 and the weighting element 61 rests on top of the fruit, not lowering it to the bottom but keeping the pieces immersed as the pieces would tend to rise to the top of the sugar solution. The filled basket 22 is placed where it will be taken by the conveyor 20 to a position directly above the chiller 15 which is the first unit of the series. Here the conveyor, just having removed a chilled basketfull of fruit from unit 15, lowers the basket 22 of blanched fruit down into the can 44 of that unit so that the basket is received in the agitator 50 which remains in the can 44 and the agitation is carried on for a normal period of say five minutes, the period being as little as three minutes for small pieces but seven minutes or more for the largest size. At the end of this period the basket 22 with its contents is raised up and out of the chiller 15 by the conveyor 20 and is transferred to the next unit, the sharp freezer 16. The sugar solution drains out but is directed back to the two cans involved in the transfer. Next it is taken from the sharp freezer and put in the deep freezer 17, and finally it is taken from the deep freezer and put into the separator 18 which could be an ordinary device like a spin dryer for clothes. The pieces of fruit are serially subjected in spaced stages to a temperature between 37° F. and 27° F., a freezing temperature of between 30° F. and 20° F., and a temperature of between 20° F. and zero, the temperatures of the second and third stages being selected so that each of these two stages removes approximately the same amount of heat from the cut pieces while holding the $H_2O$ content of the fruit at its initial level.

After the centrifugal draining machine 18 has removed the desired proportion of the surplus secondary refrigerant from the final frozen product, the latter is packaged in any of the usual type packages and is transferred to a low temperature storage room for preservation until needed.

What I claim is:

1. The method of quick freezing tropical fruits cut to a size between .10" and 3" in greatest dimension, which comprises serially subjecting the pieces in spaced stages to a temperature between 37° F. and 27° F., a freezing temperature of between 30° F. and 20° F., and a temperature of between 20° F. and zero, the temperatures of the second and third stages being selected so that each of these two stages removes approximately the same amount of heat from the cut pieces while holding the $H_2O$ content of the fruit at its initial level.

2. The method of claim 1 in which the time in each stage is between two and eight minutes, the time varying with the size of the articles, the maximum dimension of the articles is betweeen 1/4" and 2", and the medium is a sugar solution.

3. A freezing assembly comprising a receptacle to hold a liquid heat transfer medium, the inner surface of which is a surface of revolution, means for chilling the outside of the receptacle, an agitator oscillating within the receptacle and carrying means to engage said surface to scrape off ice forming thereon, and a foraminous container loosely resting upon the agitator.

4. The assembly of claim 3 in which the receptacle is a cylindrical metal can on the outside wall of which is tightly wound in the form of a helix a copper soft drawn tube, and the tube is soldered to the can on both sides of its line contact with the can so that the spaces between the coils and the can are filled with the solder.

5. In combination, a stationary receptacle to hold a liquid sugary heat transfer medium, the inside surface of which receptacle is a surface of revolution, means for chilling the receptacle, an agitator turning within the receptacle and carrying means to engage said inner surface to scrape off ice forming thereon, and a foraminous container loosely resting upon the agitator and to be turned thereby, said agitator comprising a series of equispaced parallel channel members, a circular bottom joining all of the channel members and spaced inward from the proximate ends of the channels, a ring joining all of the channels, spaced from and parallel to said bottom, said bottom having holes therein to permit free passage of the heat transfer medium.

6. The assembly of claim 3 in which the receptacle is stationary, cylindrical and of greater depth than its diameter, the agitator is oscillated within the receptacle by mechanism passing through the center of the bottom of the receptacle, and the container is a vertically removable cylindrical wire basket receiving its turning motion solely from its contact with the agitator.

7. In a quick freezing machine of the type requiring a sugary liquid heat transfer medium in contact with articles to be frozen, the combination of a plurality of cylindrical vessels each open at the top for product charging, and of a greater height than its diameter to permit inspection of the articles without material loss of refrigeration, an open-topped basket type scraper agitator within each of said vessels, an open-topped wire basket resting upon each agitator, power means for oscillating said agitators and conveyor means for transferring the loaded baskets to said agitators, whereby by suitable selection of the temperatures of the sugary heat transfer medium in each of the vessels, the heat removal loads may be equal and the time required may be the same in each vessel.

8. In combination an open mouthed stationary cylindrical receptacle, an oscillating shaft projecting vertically through the center of the bottom of the receptacle, an agitator resting upon said bottom and operatively connected to said shaft, means for chilling the outer wall of the receptacle, scrapers on the agitator for engaging the inside surfaces of the stationary receptacle, and a basket loosely positioned within the agitator to have oscillating movement therefrom.

9. The method of quick freezing tropical fruits which comprises removing the skins of the fruit, cutting the fruit into pieces with a greatest dimension of less than 3", blanching, chilling the diced pieces to a temperature just short of turning a portion of the water content to ice, then submerging the chilled diced pieces in a viscous sugar-in-water heat transfer medium containing between 60% and 67% sugar at a temperature to chill the fruit pieces at least five degrees more, then moving the fruit pieces to a further chilled sugar solution until the diced pieces reach a temperature approximating the low point of the freezing range of the fruit being chilled, the temperature being such that the time in each stage is the same, the articles retain all of their water content, and the heat removing load is equal in the three stages.

10. The method of freezing water-containing articles of food having a greatest dimension of less than three inches, which comprises chilling the food to approximately the temperature required to freeze water, subjecting the thus chilled food in a sugar solution to successively lower temperatures in a plurality of stages until the food reaches a temperature approximating the low point of its freezing range, draining the major portion of the sugar solution from the frozen food, and storing the frozen drained food containing its original $H_2O$ content at a temperature below zero Fahrenheit, said stages being so chosen that the time and the number of heat units removed in each stage is the same.

11. In a quick freezer of the immersion type, the combination with a stationary open-mouthed cylindrical can adapted to contain a liquid chilling medium, of an agitator within the can having a plurality of peripherally spaced scrapers parallel to the axis of the can to engage the inside surface of the can, means for chilling the can, a foraminous basket adapted to hold material to be frozen loosely positioned within the agitator and receiving motion therefrom as the agitator is moved, and means for moving the agitator about the axis of the can in a plurality of directions to pass the liquid medium in contact with the material to be frozen, said basket being readily removable from the agitator and can in the direction of the can axis.

12. A receptacle to hold a liquid heat transfer medium comprising a cylindrical can body having a flat bottom of a diameter smaller than the depth of the can, a copper soft drawn tube wound tightly around the can body in the form of a helix with the coils touching each other, metal fastening means secured to the tube and to the can body to aid in transferring heat from the heat transfer medium to a chilling medium in said tube, a wire mesh basket within said cylindrical can body to contain the material to be chilled, and a liquid heat transfer medium in the can body and immersing the material in the basket.

References Cited in the file of this patent

UNITED STATES PATENTS

| | | |
|---|---|---|
| Re. 24,466 | Toulmin | Apr. 29, 1958 |
| 415,901 | Dermigny | Nov. 26, 1889 |
| 1,322,660 | Voorhees | Nov. 25, 1919 |
| 1,420,740 | Petersen | June 27, 1922 |
| 1,586,898 | Haslacher | June 1, 1926 |
| 1,767,857 | Sawyer | June 24, 1930 |
| 2,006,299 | Kaestner | June 25, 1935 |
| 2,164,362 | Taylor | July 4, 1939 |
| 2,764,880 | Wenzelberger | Oct. 2, 1956 |
| 2,831,329 | Morrison | Apr. 22, 1958 |
| 2,887,851 | Toulmin | May 26, 1959 |
| 2,916,131 | Holden | Dec. 8, 1959 |
| 2,942,429 | Van Dolah et al. | June 28, 1960 |